United States Patent [19]

Toussaint

[11] Patent Number: 5,524,927
[45] Date of Patent: Jun. 11, 1996

[54] ADJUSTABLE STEERING COLUMN ASSEMBLY FOR A VEHICLE

[75] Inventor: Herve Toussaint, Rueil Malmaison, France

[73] Assignee: The Torrington Company, Torrington, Conn.

[21] Appl. No.: 277,855

[22] Filed: Jul. 20, 1994

[30] Foreign Application Priority Data

Sep. 1, 1993 [GB] United Kingdom ............ 9318089

[51] Int. Cl.⁶ ........................................... B62D 1/18
[52] U.S. Cl. .................. 280/777; 74/493; 280/775
[58] Field of Search ........................... 280/777, 775, 280/779; 74/493; 188/371, 376, 377

[56] References Cited

U.S. PATENT DOCUMENTS

| | | | |
|---|---|---|---|
| 4,463,625 | 8/1984 | Nishikawa | 74/493 |
| 4,793,204 | 12/1988 | Kubasiak | 74/493 |
| 5,131,286 | 7/1992 | Sturges et al. | 188/371 |
| 5,213,004 | 5/1993 | Hoblingre | 74/493 |
| 5,286,056 | 2/1994 | Speich | 280/777 |
| 5,377,555 | 1/1995 | Hancock | 74/493 |

FOREIGN PATENT DOCUMENTS

| | | |
|---|---|---|
| A2116496 | 9/1983 | United Kingdom . |
| 2177186 | 1/1987 | United Kingdom . |
| 2191273 | 12/1987 | United Kingdom . |
| 2252085 | 7/1992 | United Kingdom ............ 280/777 |
| WO-A-9309016 | 5/1993 | WIPO . |

Primary Examiner—Eric D. Culbreth
Attorney, Agent, or Firm—Michael H. Minns

[57] ABSTRACT

An adjustable steering column for a vehicle having a steering column including adjustment and clamping mechanism, for example a clampable mechanism to allow for reach adjustment of the steering column and for clamping the column at a desired reach position. An energy absorption mechanism is provided to absorb energy upon collapse of the steering column in a crash situation, there being a resilient-loaded pawl and ratchet mechanism associated with the adjustment and clamping mechanism, acting as a primary means in the crash situation to transfer energy from the column to the energy absorption mechanism. A handle acts both to clamp and unclamp the adjustment and clamping mechanism and to bring the pawl and ratchet mechanism into and out of engagement.

8 Claims, 4 Drawing Sheets

ADJUSTABLE STEERING COLUMN ASSEMBLY FOR A VEHICLE

BACKGROUND OF THE INVENTION

This invention relates to an adjustable steering column assembly for a vehicle and more particularly to a means for transmitting energy from the steering column to an energy absorption means during an impact.

With steering columns which have a reach adjustable facility, i.e. a facility where the steering wheel can be adjusted towards and away from the driver for optimum comfort, there is also the need to ensure that, in a crash situation, energy transmitted through the steering column to an energy absorption system upon steering column collapse is transmitted satisfactorily. In other words, the reach adjustment means needs to remain locked, or substantially so, so that steering column collapse energy can be transmitted directly to the energy absorption means.

The foregoing illustrates limitations known to exist in present adjustable steering column mechanisms. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an adjustable steering column assembly for a vehicle, comprising a steering column, adjustment and clamping means to allow for reach adjustment of the column and for clamping the column at a desired reach position, energy absorption means to absorb energy upon collapse of said steering column in a crash situation and a resiliently-loaded pawl and ratchet mechanism associated with said adjustment and clamping means, said mechanism acting as a primary means in the crash situation to transmit energy from the column to said energy absorption means.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
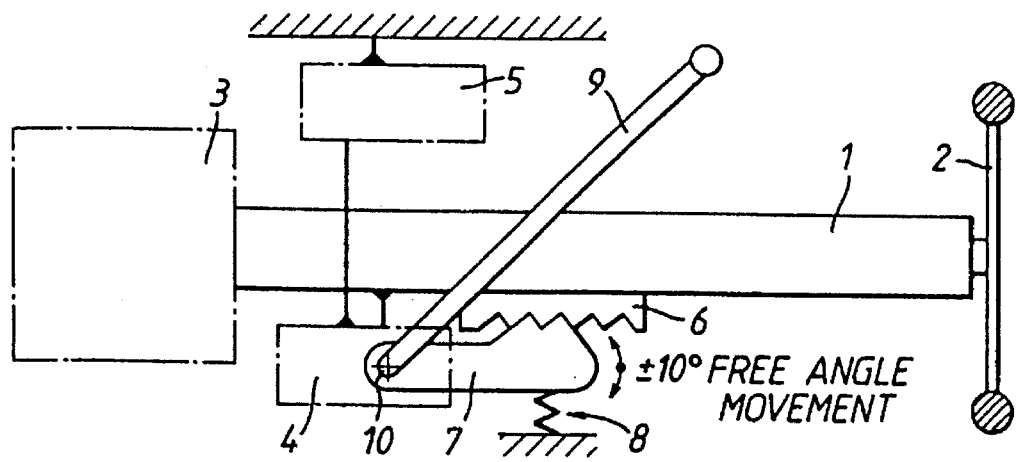
FIG. 1 is a diagrammatic view of an adjustable steering column assembly for a vehicle, the assembly being shown in a normal condition in which the column is held in an adjusted position with pawl and ratchet mechanism engaged.

Referring to the drawings, an adjustable steering column assembly for a vehicle is shown, including a steering column 1, a steering wheel 2, steering gear 3, adjustment and clamping means 4 to allow for reach adjustment of the column and for clamping the column at a desired reach position, and energy absorption means 5 to absorb energy upon collapse of the steering column in a crash situation.

There are various possibilities for the actual construction of the adjustment and clamping means 4 and the energy absorption means 5 and the embodiments illustrated are merely by way of example. Examples of adjustment and clamping means are described in U.S. Pat. Nos. 5,213,004, 4,244,237 and 4,788,880. Examples of energy absorption means are described in U.S. Pat. Nos. 5,131,286 and 5,286,056 U.S. Pat. No. 5,131,286 describes a mechanism for absorbing energy transmitted through a vehicle steering column in an impact situation having a steering column support bracket which houses a clamp bolt for positionally adjusting the steering column. The bolt is located by cam/spacers which are located in a slot. A slanted slot extension is provided which has a smaller width than the diameter of the bolt. Upon impact by the driver into the steering wheel, the bolt is forced into the slot extension, thereby deforming the slot which absorbs energy as it yields. U.S. Pat. No. 5,286,056 describes a device to absorb energy transmitted through a steering column for a vehicle in the event of a vehicle crash and/or driver impact on the steering wheel. The device includes a slotted member in the form of a saddle bracket for connection to a steering column, a second member in the form of a bolt or the like extending through the slot of the first member and a third member in the form of a strap which is arranged to restrict relative movement between the first and second members upon vehicle crash, etc. The strap is stiff but ductile and is wrapped over the bolt so that, if the steering column collapses, the bolt will move in a direction out of the slot of the first member and run into the strap which is then unwrapped, thereby absorbing energy transmitted through the steering column.

Figure 6:
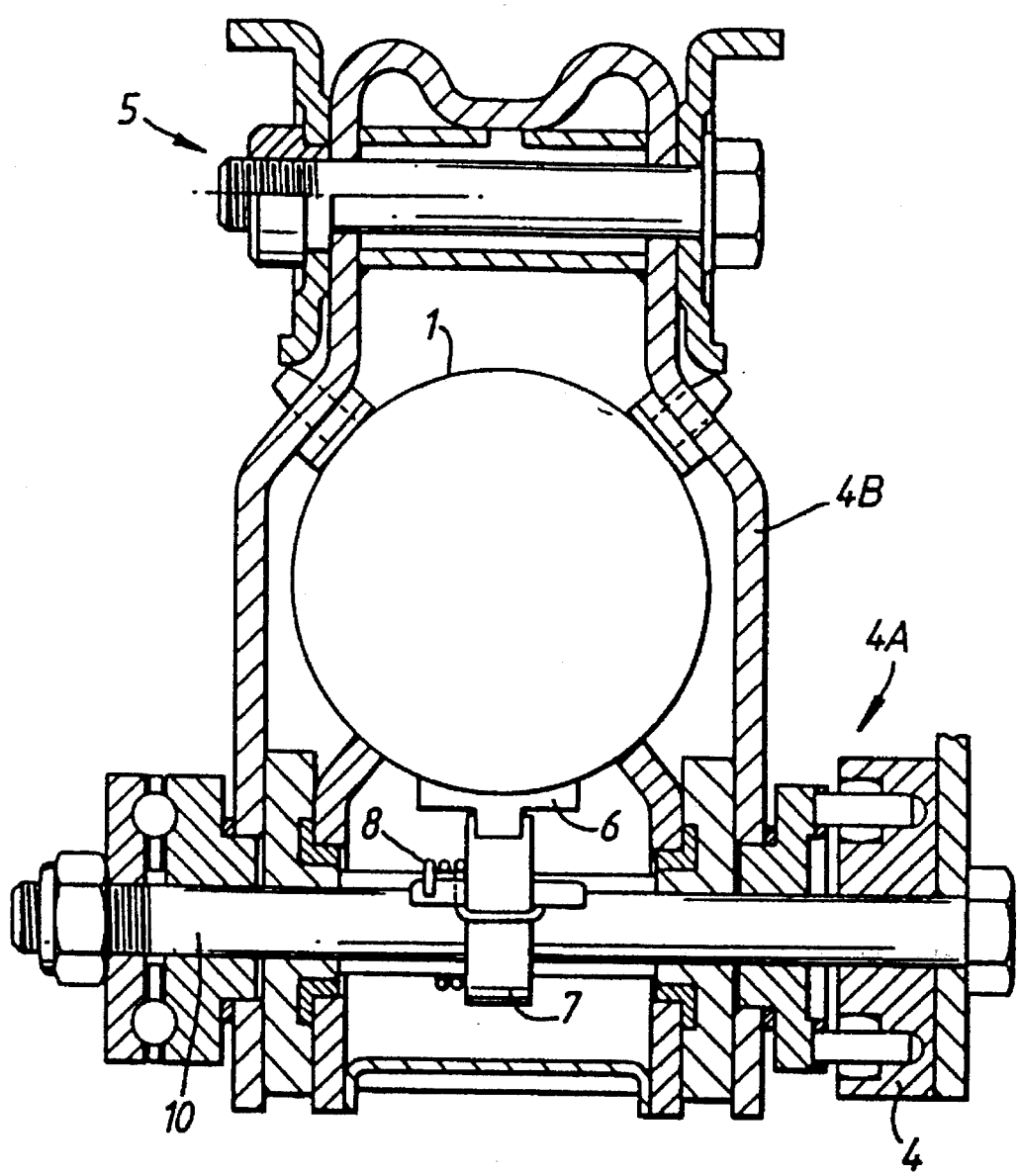
FIG. 6 is a diagrammatic sectional view taken on the line VI—VI in FIG. 5.

In the form illustrated, the adjustment and clamping means 4 is able to clamp the steering column 1 in a desired reach position by a cam mechanism 4A (FIG. 6) which causes a bracket 4B of the adjustment and clamping means 4 to clamp the steering column 1, the bracket 4B being coupled to the energy absorption means 5, which itself is mounted on a part of the vehicle. This cam mechanism 4A uses a cam engaging a plurality of rollers which are arranged to run on portions of the cam surface. The cam surface is arranged to provide a low spot for the rollers, which is the unclamped condition of the adjustment and clamping means, and a high spot for the rollers, which provides the clamped condition of the adjustment and clamping means. An even higher spot is provided between the low spot and the high spot. This higher spot provides a means for urging the rollers to either the low spot or the high spot. The higher spot also serves to retain the rollers in either the low spot or the high spot. A more detailed description of this clamping mechanism is given in U.S. Pat. No. 5,377,555. The adjustment and clamping means 4 is operated from the unclamped condition to the clamped condition by an actuating member in the form of a handle 9.

To ensure, in a crash situation, that energy of collapse of the steering column 1 is satisfactorily transmitted via the adjustment and clamping means 4 to the energy absorption means 5 while minimizing the risk of steering column slip through the adjustment and clamping means 4, a pawl and ratchet mechanism is provided which is associated with the adjustment and clamping means 4.

The pawl and ratchet mechanism includes a ratchet teeth block 6 which is fixed to part of the steering column 1, a toothed pawl 7, which is resiliently loaded towards the ratchet block 6 by a spring 8.

The handle 9 is arranged to operate 1) the adjustment and clamping means 4, to clamp and release the adjustment and clamping means 4 on the steering column 1 for reach adjustment, and 2) the pawl and ratchet mechanism. The pawl 7 is pivotably mounted on a bolt 10 that is common to the adjustment and clamping means 4.

Referring to FIG. 1, the adjustable steering column assembly is shown in its normal condition with the adjustment and clamping means 4 clamping the steering column 1 in its desired reach position, the lever 9 being shown in its engaged position and the pawl and ratchet mechanism being shown engaged. It will be seen that the spring 8 is urging the teeth of the pawl 7 into the teeth of the ratchet block 6 and allowance is made for ±10° free movement of the pawl 7, i.e., the pawl 7 can move ±10° relative to the bolt 10.

Figure 2:
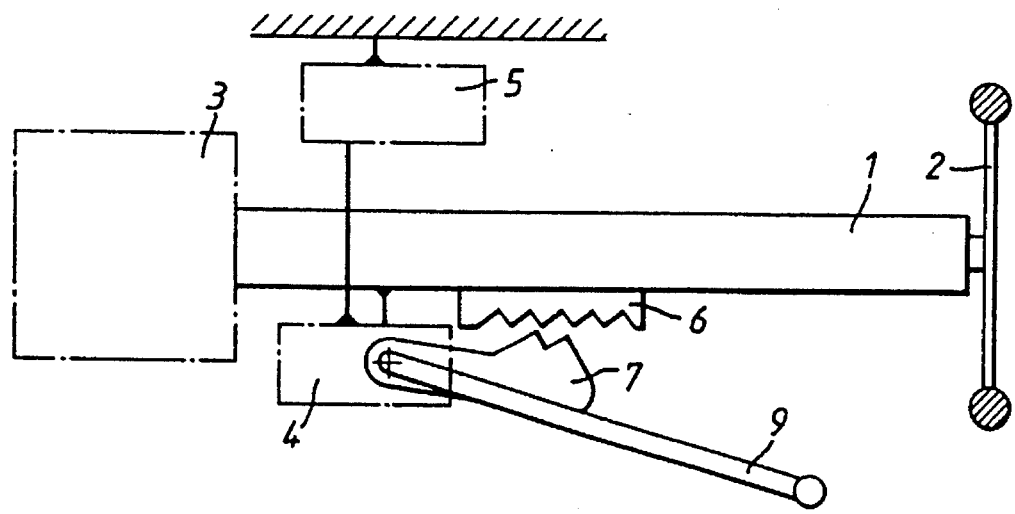
FIG. 2 is a view similar to FIG. 1 but showing the condition of the assembly to allow free reach adjustment of the steering column.

With the lever 9 in its disengaged condition as shown in FIG. 2, the pawl 7 is taken out of engagement with the ratchet block 6 against the resilient bias of the spring 8 and the adjustment and clamping means 4 is unclamped to allow for free smooth adjustment of the location of the steering wheel 2.

Figure 3:
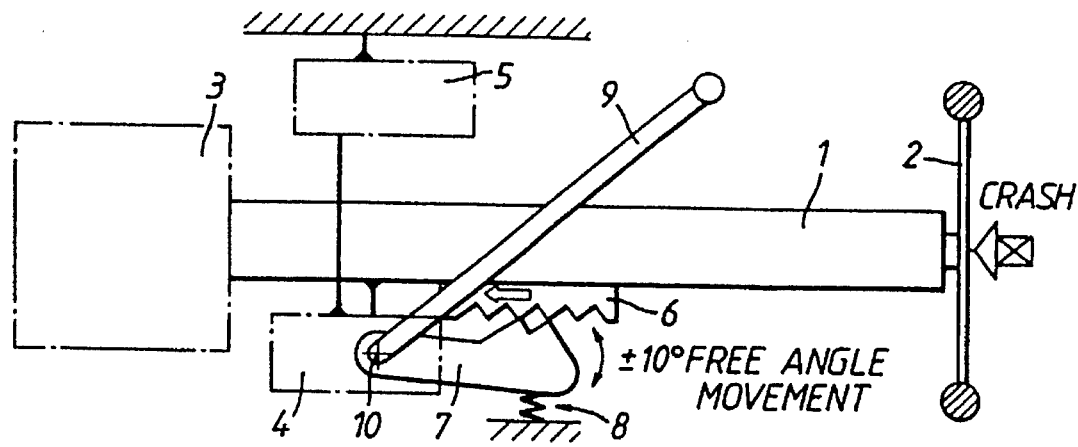
FIG. 3 is a view similar to FIG. 1 and showing a condition of the assembly at commencement of a crash situation in which the pawl and ratchet mechanism is not initially completely engaged.
Figure 4:
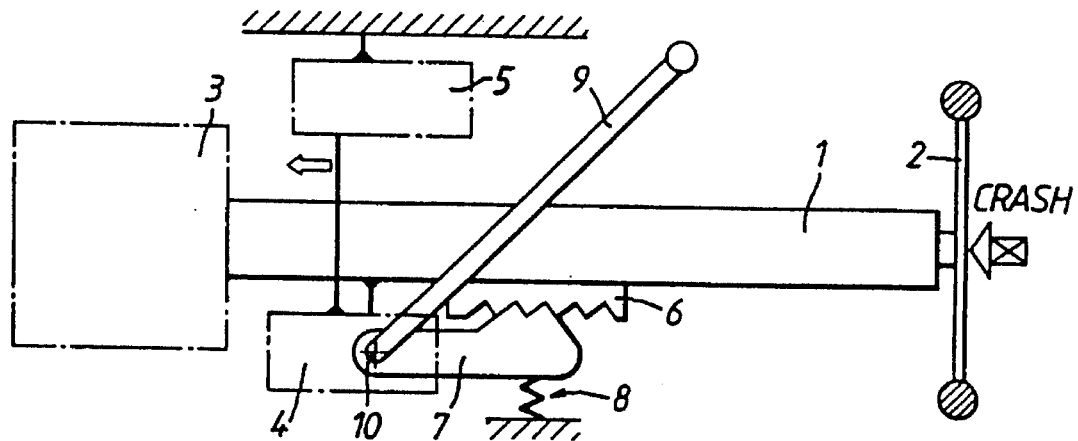
FIG. 4 is a view similar to FIG. 3 and showing the assembly in a crash situation with the pawl and ratchet mechanism engaged.
Figure 5:
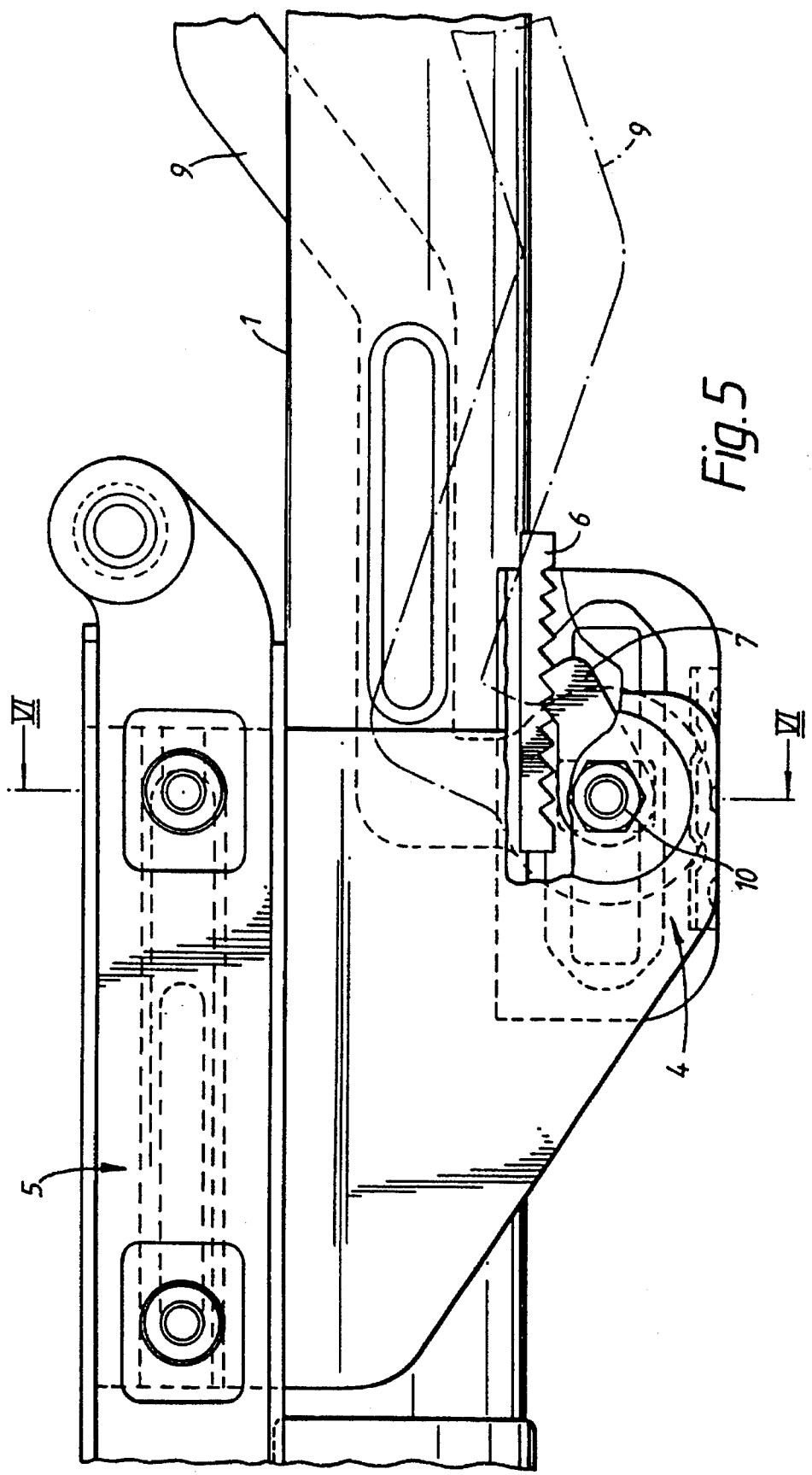
FIG. 5 is a diagrammatic side view of part of the steering column assembly and showing the pawl and ratchet mechanism, the adjustment and clamping means and the energy absorption means.

FIG. 3 shows the condition similar to FIG. 1 but in a crash situation. It will be noted that, in this case, adjustment of the steering column 1 has brought the assembly into a condition where, although the adjustment and clamping means 4 is clamping the steering column, the teeth of the pawl 7 are riding on top of the teeth of the ratchet block 6. Of course, this makes no difference in a normal situation since the adjustment and clamping means 4 clamps the steering column 1 in the desired position, but upon crash the tendency will be for the steering column 1 to slip slightly through the clamped adjustment and clamping means 4 and this will then cause the ratchet block 6 to run over the pawl 7 so that the spring 8 rapidly engages the teeth of the pawl 7 with the teeth of the block 6 as shown in FIG. 4. From that instant, energy of steering column collapse is transmitted directly through the locked pawl and ratchet mechanism to the energy absorption means 5, thereby allowing the energy absorption means 5 to work alone to control as well as possible the collapse efforts during the crash. Without the locked pawl and ratchet mechanism, the adjustment and clamping means 4 can allow the steering column 1 to slip in a crash situation.

Having described the invention, what is claimed is:

1. An adjustable steering column assembly for a vehicle, comprising;

a steering column;

adjustment and clamping means to allow for reach adjustment of the column and for clamping the column at a desired reach position:

energy absorption means to absorb energy upon collapse of said steering column in crash situation;

a resiliently-loaded pawl and ratchet mechanism associated with said adjustment and clamping means, said mechanism acting as a primary means in the crash situation to transmit energy from the column to said energy absorption means, the mechanism being resiliently loaded for engagement; and a single actuating member to actuate said adjustment and clamping means and to bring the pawl and ratchet mechanism out of engagement and to allow it to be biased into engagement.

2. An adjustable steering column assembly for a vehicle, comprising;

a steering column;

adjustment and clamping means to allow for reach adjustment of the column and for clamping the column at a desired reach position;

energy absorption means to absorb energy upon collapse of said steering column in a crash situation; and a resilient-loaded pawl and ratchet mechanism associated with said adjustment and clamping means, said mechanism acting as a primary means in the crash situation to transmit energy from the column to said energy absorption means, the mechanism being resiliently loaded for locking engagement, wherein said adjustment and clamping means includes cam means to clamp the steering column in a desired reach position, said cam means causing a bracket of said adjustment and clamping means to clamp the steering column.

3. An assembly according to claim 2, wherein said bracket is coupled to said energy absorption means, said energy absorption means being mounted on a part of the vehicle.

4. An adjustable steering column assembly for a vehicle, comprising;

a steering column;

adjustment and clamping means to allow for reach adjustment of the column and for clamping the column at a desired reach position;

energy absorption means to absorb energy upon collapse of said steering column in a crash situation; and a resiliently-loaded pawl and ratchet mechanism associated with said adjustment and clamping means, said mechanism acting as a primary means in the crash situation to transmit energy from the column to said energy absorption means, the mechanism being resiliently loaded for locking engagement, wherein said pawl and ratchet mechanism includes a ratchet teeth block fixed to part of the steering column.

5. An adjustable steering column assembly for a vehicle comprising:

a reach adjustable steering column;

an adjustment and clamping mechanism for allowing reach adjustment of the reach adjustable steering column and for clamping the adjustable reach steering column in a desired position;

energy absorption means to absorb energy upon collapse of the adjustable reach steering column in crash situation; and a means for transmitting energy from the reach adjustable steering column to the energy absorption means, wherein the means for transmitting energy comprises:

a ratchet teeth block fixed to a portion of the adjustable reach steering column;

a pawl; and a means for biasing the pawl into engagement with the ratchet teeth block in a crash situation.

6. An adjustable steering column assembly for a vehicle comprising:

a reach adjustable steering column;

an adjustment and clamping mechanism for allowing reach adjustment of the reach adjustable steering column and for clamping the adjustable reach steering column in the desired position;

energy absorption means to absorb energy upon collapse of the adjustable reach steering column in a crash situation; and a means for transmitting energy from the reach adjustable steering column to the energy absorption means, the means for transmitting energy comprising: a ratchet teeth block fixed to a portion of the adjustable reach steering column; a pawl; and a means for biasing the pawl into engagement with the ratchet teeth block in a crash situation.

7. The adjustable steering column assembly according to claim 6, wherein the adjustment and clamping means includes an actuating member for moving the adjustment and clamping means from a clamped condition to a clamped condition, the actuating member also causing the pawl to move out of engagement with the ratchet teeth block when the adjustment and clamping means is in an unclamped condition.

8. The adjustable steering column assembly according to claim 7, wherein the actuating member include a bolt member, the pawl being operatively connected to the bolt member, the pawl being able to move rotationally within predetermined limits with respect to the bolt member.

* * * * *